(12) United States Patent
Lowry et al.

(10) Patent No.: US 8,244,822 B1
(45) Date of Patent: Aug. 14, 2012

(54) PUSH NOTIFICATION DELIVERY SYSTEM

(75) Inventors: Adam C Lowry, Portland, OR (US); Erik A Onnen, Portland, OR (US)

(73) Assignee: Urban Airship, Inc., Portland, OR (US)

( * ) Notice: Subject to any disclaimer, the term of this patent is extended or adjusted under 35 U.S.C. 154(b) by 0 days.

(21) Appl. No.: 13/326,269

(22) Filed: Dec. 14, 2011

Related U.S. Application Data (63) Continuation of application No. 13/160,190, filed on Jun. 14, 2011.

(51) Int. Cl.
 *G06F 15/16* (2006.01)
(52) U.S. Cl. ......................... 709/206; 709/202
(58) Field of Classification Search .......... 709/201–207, 709/224–226
 See application file for complete search history.

(56) References Cited

U.S. PATENT DOCUMENTS

| | | | |
|---|---|---|---|
| 6,421,781 B1 * | 7/2002 | Fox et al. ........................ | 726/4 |
| 8,064,896 B2 * | 11/2011 | Bell et al. ..................... | 455/422.1 |
| 2011/0029598 A1 * | 2/2011 | Arnold et al. ................. | 709/203 |
| 2011/0173681 A1 * | 7/2011 | Qureshi et al. ................... | 726/4 |
| 2011/0252240 A1 * | 10/2011 | Freedman et al. ............ | 713/169 |

* cited by examiner

*Primary Examiner* — Chirag R Patel
(74) *Attorney, Agent, or Firm* — Van Pelt, Yi & James LLP (57) ABSTRACT

An example method for delivery of push notifications includes receiving a push notification including a message and a destination, creating a send token, sending a push notification derived from the received push notification and the send token, and receiving push information concerning a processing of the sent push notification which is identified by the send token. An example system for delivering push notifications includes a server system having a processor, memory, and a network interface, where the memory stores program instructions including code segments for receiving a received push notification via the network interface. In this example, the program instructions further includes code segments for creating a send token, code segments for sending a sent push notification derived from the received push notification and the send token via the network interface, and code segments for receiving received push information concerning a processing of the sent push notification are provided.

20 Claims, 11 Drawing Sheets

PUSH NOTIFICATION DELIVERY SYSTEM

CROSS REFERENCE TO RELATED APPLICATIONS

This application is a continuation of U.S. Ser. No. 13/160,190 filed Jun. 14, 2011 and is related to: U.S. Ser. No. 13/160,213, filed Jun. 14, 2011, U.S. Ser. No. 13/160,226, filed Jun. 14, 2011, and U.S. Ser. No. 13/326,294, filed concurrently herewith on Dec. 14, 2011, all of which are incorporated herein by reference.

BACKGROUND

Push technology (aka "server push") is a type of Internet-based communication where the request for a given transaction is initiated by a "publisher" or server. It is contrasted with pull technology where the request for transmission of information is initiated by a receiving device or "client."

Push services are sometimes based upon information preferences expressed in advance. This is referred to as a "publish/subscribe" model. For example, a client might subscribe to one or more information "channels." The server associated with the channels can then push information to the client when new content becomes available.

There are many types of push services. For example, synchronous conferencing and instant messaging are forms of push services. Increasingly popular are push-enabled web applications including market data distribution (e.g. stock tickers), online chat/messaging systems (e.g. "webchat"), auctions, online betting and gambling, sports results, monitoring consoles and sensor network monitor.

There are also hybrid push/pull systems. For example, email begins as a push system in that the SMTP protocol upon which it is based is a push protocol. However, the last step in the delivery of an email, e.g. from a mail server to a desktop computer, typically uses a pull protocol such as POP3 or IMAP.

As will be appreciated, there are many and widespread uses for push technology. However, one drawback of such technology is that there is no little or feedback to the publisher as to how the pushed information is being used or, in some cases, if the information was even successfully received. Therefore, push technology tends to be a one-way form of communication from publisher to client without the benefit of feedback from the client.

These and other limitations of the prior art will become apparent to those of skill in the art upon a reading of the following descriptions and a study of the several figures of the drawing.

SUMMARY

By way of non-limiting example, a method for delivery of push notifications includes receiving a push notification including a message and a destination, creating a send token, sending a push notification derived from the received push notification and the send token, and receiving push information concerning a processing of the sent push notification which is identified by the send token. The send token is stored, in certain non-limiting examples, in a non-transitory computer readable medium to identify the sent push notification. Also, the received push information can be stored, for example, in a non-transitory computer readable medium. In a further non-limiting example, a push token can be created after receiving the received push notification and subsequently stored in non-transitory computer readable medium.

An example system for delivering push notifications includes, by way of non-limiting example, a server system having a processor, memory, and a network interface, where the memory stores program instructions comprising code segments for receiving a received push notification via the network interface. In a further example, code segments for creating a send token, code segments for sending a sent push notification derived from the received push notification and the send token via the network interface, and code segments for receiving received push information concerning a processing of the sent push notification are provided.

Program instructions stored in non-transitory computer readable media, by way of non-limiting example, include code segments for receiving a received push notification including a message and a destination, code segments creating a send token, code segments sending a sent push notification derived from the received push notification and the send token, and code segments receiving received push information which is identified by the send token concerning a processing of the sent push notification. The program instructions can further include, for example, code segments for creating a push token after receiving the received push notification. By a still further non-limiting example, the program instructions can include code segments for storing in a persistent database at least one of the received push notification, the sent push notification, the send token and the push token.

Program instructions stored in non-transitory computer readable media, by way of non-limiting example, include code segments for receiving a push notification with send token, code segments for processing the push notification, and code segments for sending push information which is identified by the send token concerning the processing of the push notification. By way of further non-limiting example, the code segments for processing the push notification can be associated with an application program.

An advantage of certain examples is that push notifications can be effectively sent to one or more destinations. Another advantage of certain example embodiments is that information concerning the processing of push notifications can be derived.

These and other embodiments and advantages and other features disclosed herein will become apparent to those of skill in the art upon a reading of the following descriptions and a study of the several figures of the drawing.

BRIEF DESCRIPTION OF THE DRAWINGS

Several examples will now be described with reference to the drawings, wherein like components are provided with like reference numerals. The examples are intended to illustrate, but not to limit, various aspects of inventions disclosed herein. In the drawings.

DETAILED DESCRIPTIONS

Figure 1:
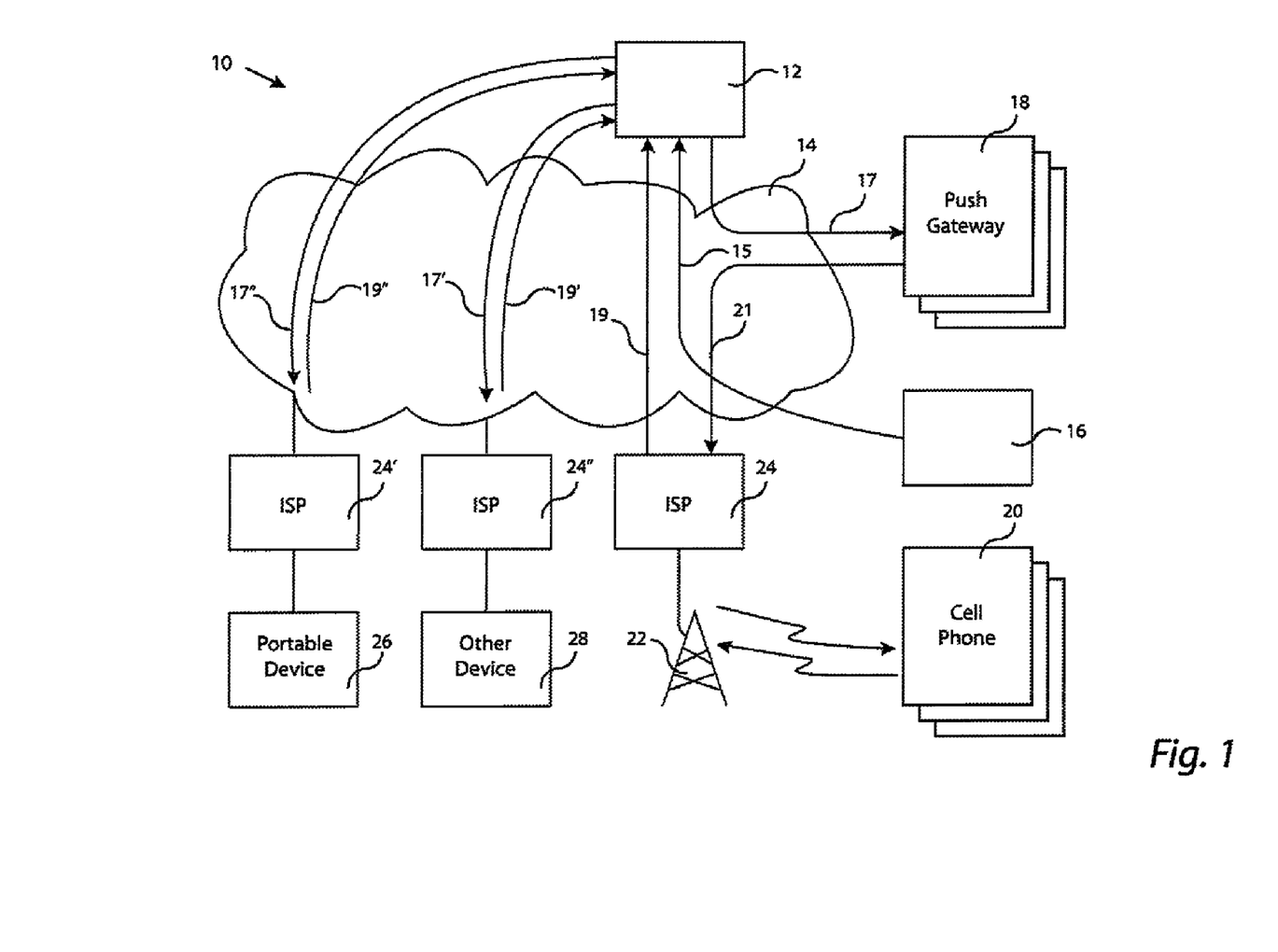
FIG. 1 is a diagram depicting an example system for delivering push notifications.

FIG. 1 is a diagram depicting, by way of non-limiting example, a system 10 for delivering push notifications. In this example, a notification server system 12 is coupled to the Internet 14 for TCP/IP communication. As will be appreciated by those of skill in the art, the server system 12 may include one or more servers.

Stored in memory of notification server system 12 are program instructions including a number of code segments for implementing various processes of the server system 12. For example, the notification server system 12 includes code segments for receiving a received push notification 15 from a push originator server system 16 (such as a customer website) via Internet 14. The received push notification can include a message and a destination, for example.

Example notification server system 12 can also include code segments for creating a send token and a sent push notification, e.g. a sent push notification 17, derived from the received push notification 15. The send token can be used to distinguish the sent push notification from other push notifications. For example, the sent push notification 17 with send token can be sent over the Internet to a push gateway server system 18. The push gateway server system 18 can then send, for example, a push notification to a cell phone 20. In other embodiments, a sent push notification 17'/17" with send token can be sent to other destinations such as a client computer, proxy server, device, etc.

In this example, gateway server system 18 is typically provided by a provider implementing push notification protocols which are particular to, for example, a certain type of cell phone 20. For example, iPhone® and Android® cell phones have dedicated push gateways maintained by Apple, Inc. and Google, Inc., respectively. It should be noted that the push gateway server system 18 may be part of notification server system 12 or may be separate, as shown in FIG. 1.

In the example of FIG. 1, code segments are also included in notification server system 12 for receiving received push information 19 concerning a processing of the sent push notification. These code segments can, for example, identify the sent push notification from the received push information 19 by the send token. For example, received push information can be developed by a cell phone 20 which is coupled to a cellular network 22 and from there to the Internet 14, such as by an Internet Service Provider (ISP) 24. TCP/IP protocol communications can thus occur between cell phone 20 and notification server system 12 including the received push information 19.

It will be appreciated that cell phone 20 is just one example of a device or "client" that is receptive to push notifications. For example, a portable device 26 can communicate through Internet 14 via an ISP 24' using a WiFi or cable connection. Other devices 28, such a personal computers, can also communicate with the Internet 14 via an ISP 24". Alternatively, devices receptive to push notifications may be coupled directly to Internet 14. In any event, the devices, however they may be coupled to the Internet, are capable of communicating with notification server system 12 to provide, for example, received push information 19.

Thus, despite the different ways in which they are coupled to Internet 14, portable device 26, other device 28 and still other devices, systems and apparatus not shown can participate in the receiving of push notifications and the providing of information concerning a processing of a push notification in much the same way described previously with respect to the example of cell phone 20. By way of further non-limiting examples, portable device 26, other device 28 and still other devices, systems and apparatus may receive sent push notifications 17 without the intermediary of a push gateway server system 18.

According to certain example embodiments, notification server system 12 receives a push notification including a message and a destination from push originator server system 16. Upon receiving the push notification, notification server system 12 can create, for example, a push token. As used herein, a "push token" is an identifier used to represent the received push notification and is suitable to be used as a key in performing lookups to retrieve information pertaining to the received push notification identified by the push token. The push token may be derived in some way from the received push notification and/or metadata related thereto (e.g. a hash) or may be otherwise generated or assigned (e.g. it may be randomly assigned).

In this example, an operation is performed by which the recipients of the push message are identified. Further, push messages are generated which are addressed to the one or more recipients of the push notification and which preferably include another identifier referred to as a "send token." As used herein, a "send token" is an identifier used to represent a sent push notification and is suitable to be used as a key in performing lookups to retrieve information pertaining to the sent push notification identified by the send token. The send token may be linked to the sent push notification or may be unrelated to the sent push notification.

The send token, in this example, is therefore used to represent the sent push notification. The send token may also be associated with the push token on a one-to-one or many-to-one basis. That is, a single push token may be associated with a single send token or with multiple send tokens. In such an arrangement, it is possible to retrieve information about the receive push notification associated with the push token using the send token as a key, and also possible to, given a push token, retrieve information about the sent push messages associated with one or more associated send tokens. It is therefore apparent that a one-to-many mapping may exist between the push token and the send tokens and that this mapping can be used to obtain related information given a push token or a send token.

By way of non-limiting example, a sent push notification 17, 17' or 17" derived from a received push notification 15 and a send token is sent over the Internet 14 to a designated destination. For example, push gateway server system 18 is configured to forward the sent push notification 17 to its destination, e.g. cell phone 20 or other mobile device, by non-limiting examples. Notification server system 12 is disposed to receive push information 19, 19' or 19" concerning a processing of the sent push notification as identified by the related send token.

The send token can be, for example, stored in a memory of notification server system 12 to identify the sent push notification. Also, the received push information can be stored, for example, in a memory of notification server system 12. The received push notification and/or the sent push notification can also be stored in a memory of notification server system 12, for example.

By way of further example, a push token can be created after receiving the received push notification and can be subsequently stored in a memory of notification server system 12. The sent push notification can be sent to one or more destinations. In this example, a number of send tokens are created corresponding to the number of destinations. It will therefore be apparent that there can be a one-to-one or many-to-one mapping between the send token(s) and the push token.

By way of non-limiting example, program instructions stored in a memory of notification server system 12 can include code segments for receiving a received push notification including a message and a destination, code segments creating a send token, code segments sending a sent push notification derived from the received push notification and the send token, and code segments receiving received push information which is identified by the send token concerning a processing of the sent push notification. In this example, the program instructions can further include code segments for creating a push token after receiving the received push notification. By still further example, the program instructions can include code segments for storing in a persistent database of notification server system 12 at least one of a received push notification, a sent push notification, a send token and a push token.

By way of example and not limitation, a device or "client," such as a cell phone 20, portable device 26 or other device 28, may include program instructions stored in a memory which include code segments for receiving a push notification with send token, code segments for processing the push notification and code segments for sending push information which is identified by the send token concerning the processing of the push notification. Such push information can be sent to, for example, notification server system 12 to provide feedback from the device as to the processing of the push notification.

By way of non-limiting example, code segments for processing the push notification can be associated with an application program running on the client. For example, code segments for processing the push notification can include a library of code segments which can be utilized by the application program. Further, the push information, in this example, includes information concerning the use of the push notification by the application program. The push information may be augmented by other information, such as life cycle event information pertaining to the device or an application program of the device. Such life cycle information may be sent separately or may in some cases accompany the push information.

Figure 2:
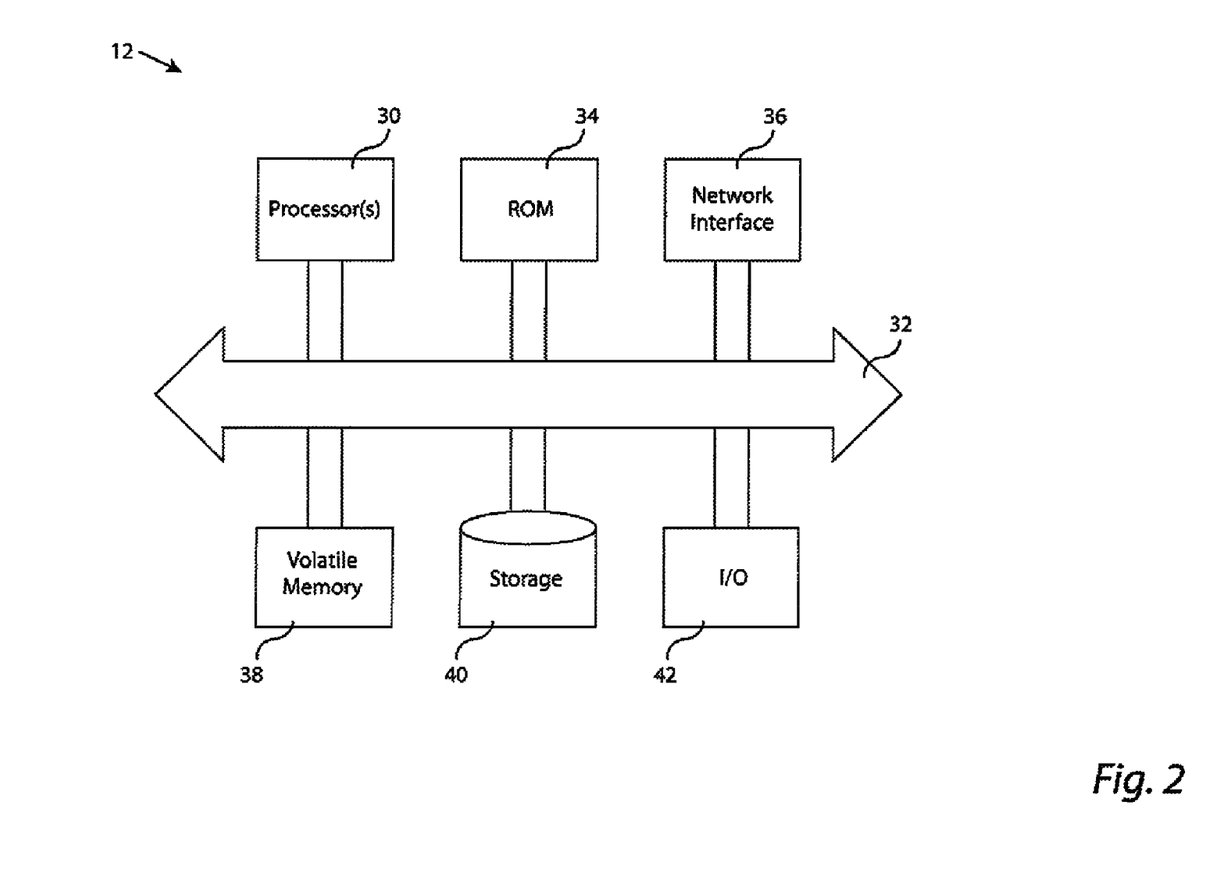
FIG. 2 is a block diagram of an example notification server system 12 of FIG. 1.

FIG. 2 is a block diagram depicting certain example embodiments of, for example, a notification server system 12 of FIG. 1 which comprises at least one processor 30, which may be a multi-core processor and may include a cache memory, coupled to a bus 32. Also coupled to bus 32 is a ROM 34 which typically contains program instructions comprising a BIOS of notification server system 12. A network interface 36 is coupled between bus 32 and a network (e.g. the Internet). Volatile memory 38 is coupled to bus 32 to act as a fast random access memory (RAM) of processor 30. In addition to processor 30, other devices coupled to bus 32 may access volatile memory 38 using, for example, DMA transfers. As used herein, "volatile memory" will refer to memory that loses data when its power source is removed.

Non-volatile memory 40 is, by way of non-limiting example, coupled to bus 32 and can serve as storage for the various program instructions and data for notification server system 12. As used herein, "non-volatile memory" shall refer to a non-volatile computer readable medium such as a hard disk drive, optical drive, flash memory or other computer readable memory which does not lose data when power is removed. In certain examples some or all of the non-volatile memory remote or network attached storage.

Both volatile memory and non-volatile memory are examples of non-transitory computer readable media. As used herein, "non-transitory computer readable media" refers to a physical memory and excludes propagating electromagnetic waves and/or other forms of non-statutory subject matter in accordance with current USPTO protocols.

According to certain example embodiments, non-volatile memory 40 will store program instructions comprising an operating system for notification server system 12. The operating system may be UNIX, Linux, Windows, or another operating system, as will be appreciated by those of skill in the art. Further, a portion of the storage capacity of non-volatile memory 40 may be used to store one or more databases and associated code segments. Of course, operating system code segments, databases and associated code segments, etc. may also be stored in volatile memory for as long as it is provided with power.

I/O subsystem 42 is coupled to bus 32 and handles the various input and output operations of notification server system 12, which may include, by way of example and not limitation, output to a display, input from a keyboard, input from a pointing device, etc. Such devices may be coupled part-time to I/O subsystem 42. Such devices may also be coupled via the network interface and a network which may be Internet 14 or another LAN or WAN. This allows for remote control and monitoring of notification server system 12.

It should be noted that the notification server system 12 of FIG. 1 may comprise multiple servers, load balancers, etc. Therefore, as used herein, a "notification server system" comprises one or more servers configured to implement the processes described herein. The notification server system 12 depicted in FIG. 2 is but one example hardware configuration for a notification server system.

Figure 3:
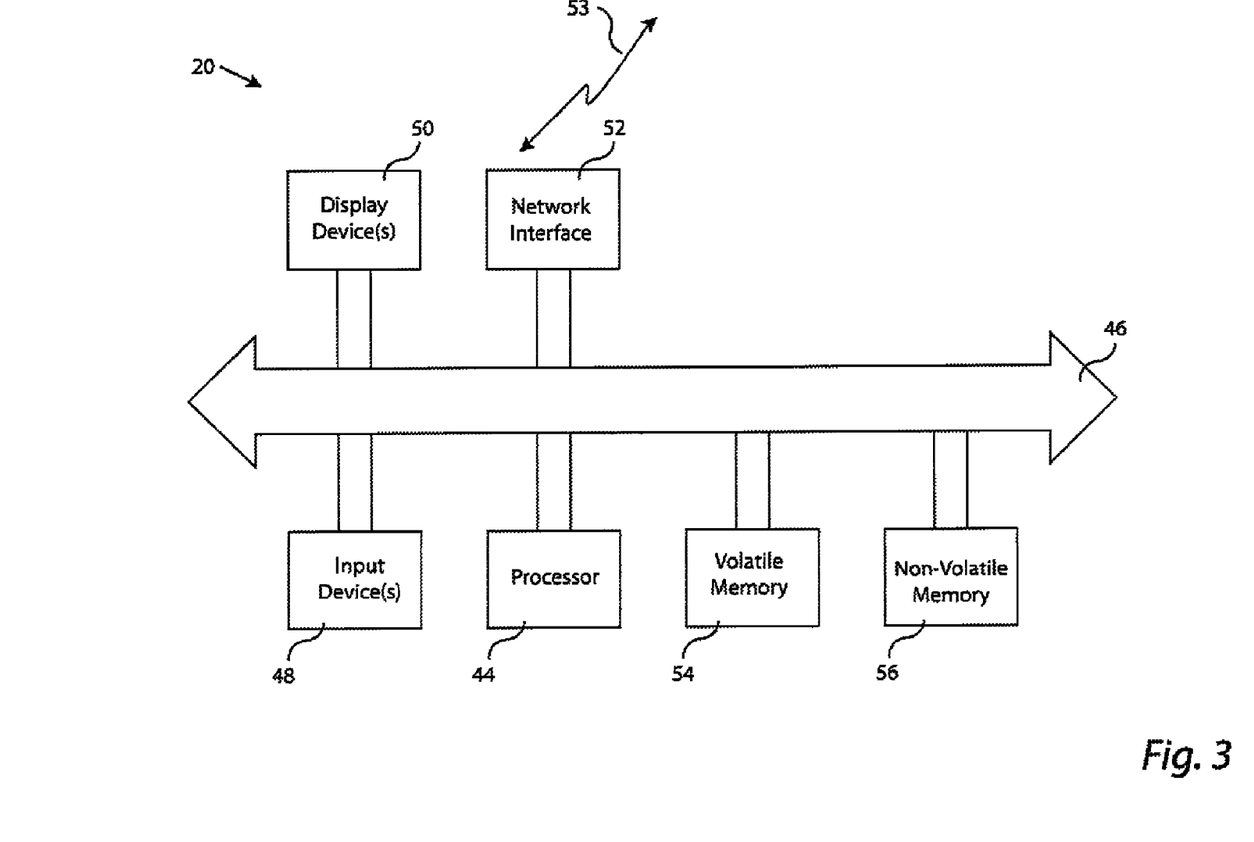
FIG. 3 is a block diagram of an example device 20 of FIG. 1.

FIG. 3 is a block diagram depicting certain example embodiments of a device such as cell phone 20 of FIG. 1. In this example, cell phone 20 includes a processor 44, which may be a multi-core processor and may include a cache memory, which is coupled to bus 46. Also coupled to bus 46, in this example, is input device subsystem 48 which comprises various input devices, which may include, by way of example and not limitation, a pointing device, such as a touch screen, a keyboard input device, which may be physical or software generated (virtual), a microphone for audio input, a camera for the input of still images or video, and various other sensors. Input device subsystem 48 of cell phone 20 may have more or fewer devices depending on design choice, cost, etc.

A display subsystem 50 of cell phone 20 is coupled to bus 46 and may include, by way of example and not limitation, a flat panel display such as an LCD display, electronic paper display, etc., an adapter to drive other attachable displays, etc. Also, display subsystem 50 of cell phone 20 may include an electro-acoustic transducer (aka "speaker" or "earphone") for audio output.

In this example, a network interface 52, coupled to bus 46, provides access to a cellular network 22. This is typically accomplished with a bidirectional RF digital communication link 53. A memory 54 serves, in this example, as a random access (RAM) memory of processor 44.

In addition to processor 44, other devices coupled to bus 46 may access memory 54 (which may be volatile memory) using, for example, DMA transfers. A non-volatile memory 56 (e.g. "flash" memory) is coupled to bus 46 in certain examples, which can provide storage for program instructions for an operating system of cell phone 20, as well as program instructions for the various applications of cell phone 20.

Figure 4:
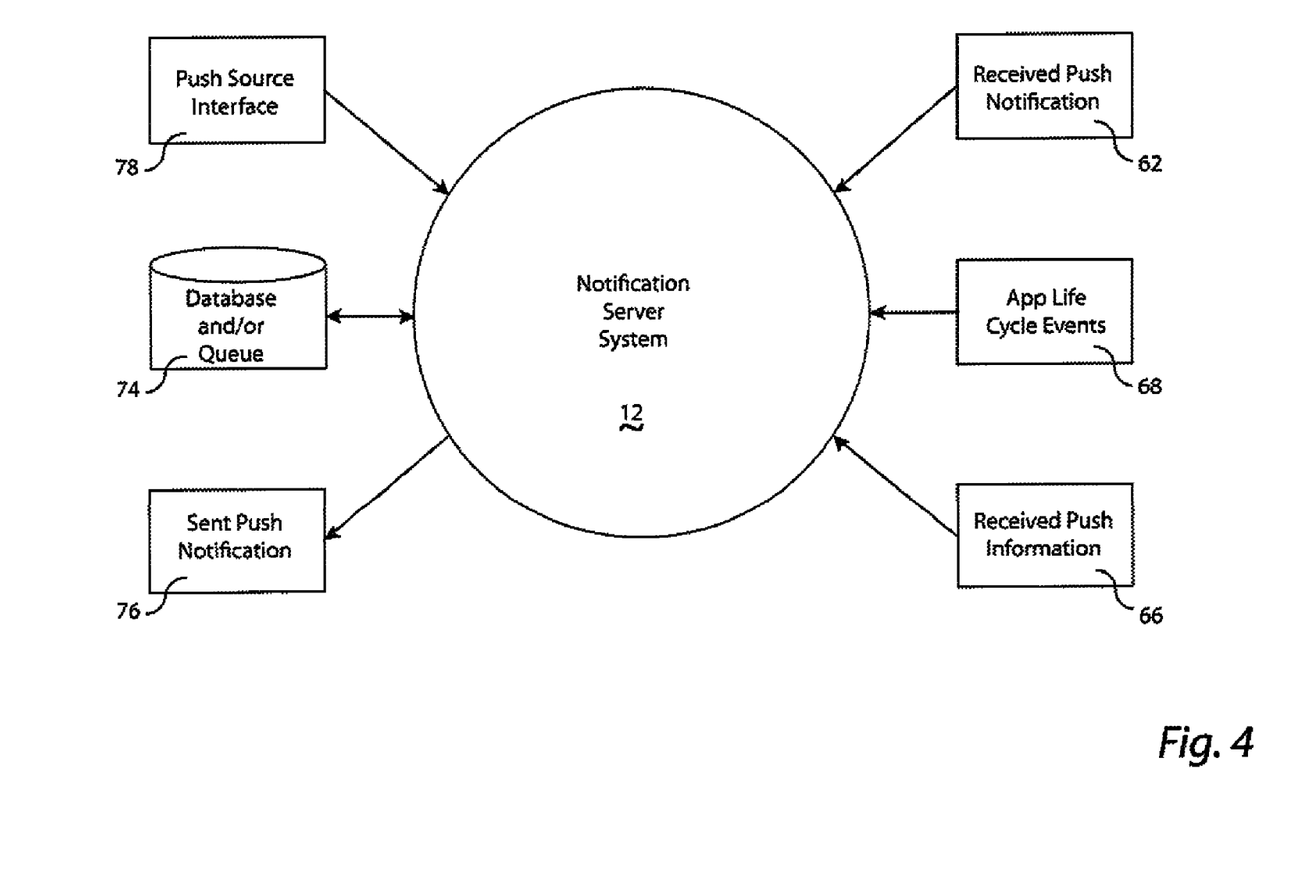
FIG. 4 is an illustration of example processes and operations of the notification server system 12 of FIG. 1.

FIG. 4 is an illustration of certain computer implemented processes performed by the example notification server system 12. The processes of notification server system 12 are responsive to: received push notification 62 from a push source such as, for example, push originator system 16 of FIG. 1; a received push information 66 from, for example, a client 20, 26 or 28; optional application ("app") life cycle events 68 from a client; and push source interface events 78 from a push source, such as push originator system 16. The processes of notification server system 12 are also illustrated to communicate with a database and/or queue 74, which may also form a part of the notification server 12. The notification server system 12 also provides a sent push notification 76, as will be explained in more detail subsequently.

By way of non-limiting example, the received push notification can be received by an API call from push originator server system 16 of FIG. 1. These API calls can be made, by way of a non-limiting example, using a REST based API. As well known to those of skill in the art, "REST" is an acronym for Representational State Transfers and is a way of organizing state transitions of and communications between computers (clients and servers) communicating in a network environment, typically using HTTP or HTTPS protocol. REST based operations often include the ability to create, read, update and delete resources specified by a hierarchical specifier in a URL. For example, an API call comprising a received push notification can be as follows:

push<message><application><recipient><options>
recipient can be a device GUID or a tag which refers to a stored list of device GUIDs <push token> is added as a named field for tracking After processing a received push notification 62, the notification server system 12 sends a sent push notification 76 to, for example, the push gateway server system 18 of FIG. 1. For example, a push notification can implement the following format:

push<message><send token>

Notification server system 12 can also, for example, be responsive to a push source interface 78 which comprises, for example, a REST based API to be used to query statistical information concerning the use of a certain application which may be stored in database and queue subsystem 74, as well as many other kinds of queries, information upload operations, information update operations, and information deletion operations. By way of further example, notification server system 12 is also responsive to received push information 66 and/or app life cycle events 68, typically from clients.

Notification server system 12 can, for example, also include other processes such as processes to develop statistics from data stored in database and/or queue 74 such as received push information 66 and app life cycle events 68. For example, statistics can be developed such as the number of times a certain application program is opened, initialized, closed, foregrounded, backgrounded, etc. on one or more clients. An example of received push information 66 takes the following format:

push receive event<token><payload>

An example of an app life cycle event 68 takes the following format:

life cycle event<payload>
the payload may contain information specifying what happened on the device like "started this application", etc.

A still further example process that can be performed by notification server system 12 is to periodically scan database and/or queue 74 for data that requires processing. After identifying such data, processes can be initiated to, for example, enqueue a job to process the database and/or queue, typically to create derived data products.

Figure 5:
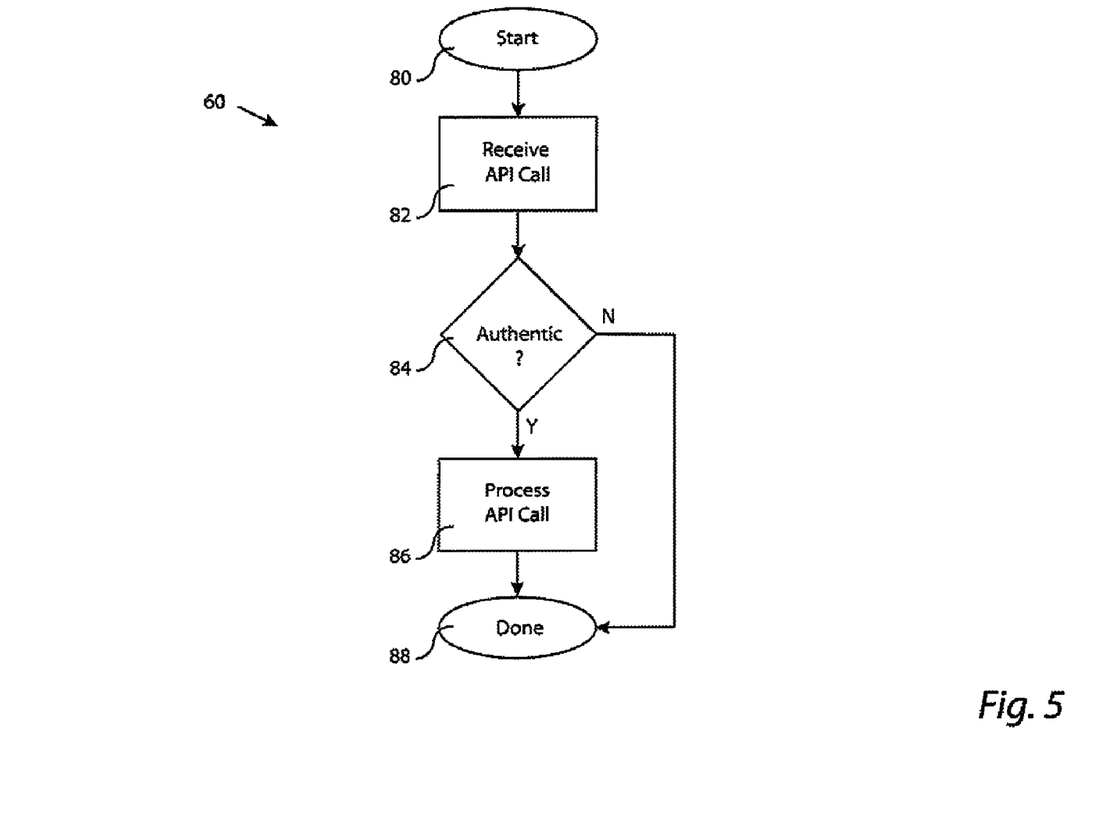
FIG. 5 is a flow diagram of an example process of the notification server system 12 of FIG. 1.

FIG. 5 is a flow diagram depicting an example computer implemented process 60 performed by, for example, notification server 12. The process 60 begins at 80, and continues in an operation 82 which receives an API call for a received push notification 62. In certain embodiments, this is accomplished by providing server code able to receive an HTTP or HTTPS request which may be part of a REST API. Then, in an operation 84, a determination is made as to whether the API call is authentic. This can be accomplished by requiring an authentication code or codes as part of the request. Preferably, some form of encryption is used so that unauthorized systems which may intercept the request cannot successfully pose as an authorized caller. Protocols and encryption codecs for performing such encryption are well known to those of skill in the art.

If in operation 84 it is determined that the API call is authentic, an operation 86 processes the API call by, for example, expanding a recipient list, applying filters, and enqueuing derived messages for forwarding to one or more push gateways. The operation is then completed in an operation 88. If in operation 84 it is determined that the API call was not authentic, the operation is completed at 88.

It should be noted that process 60 may operate in a multi-threaded mode, concurrently processing multiple requests, using resource locking state such as mutexes and or semaphores when manipulating data structures or other resources which could potentially become corrupted without the use of resource locking state.

Figure 6:
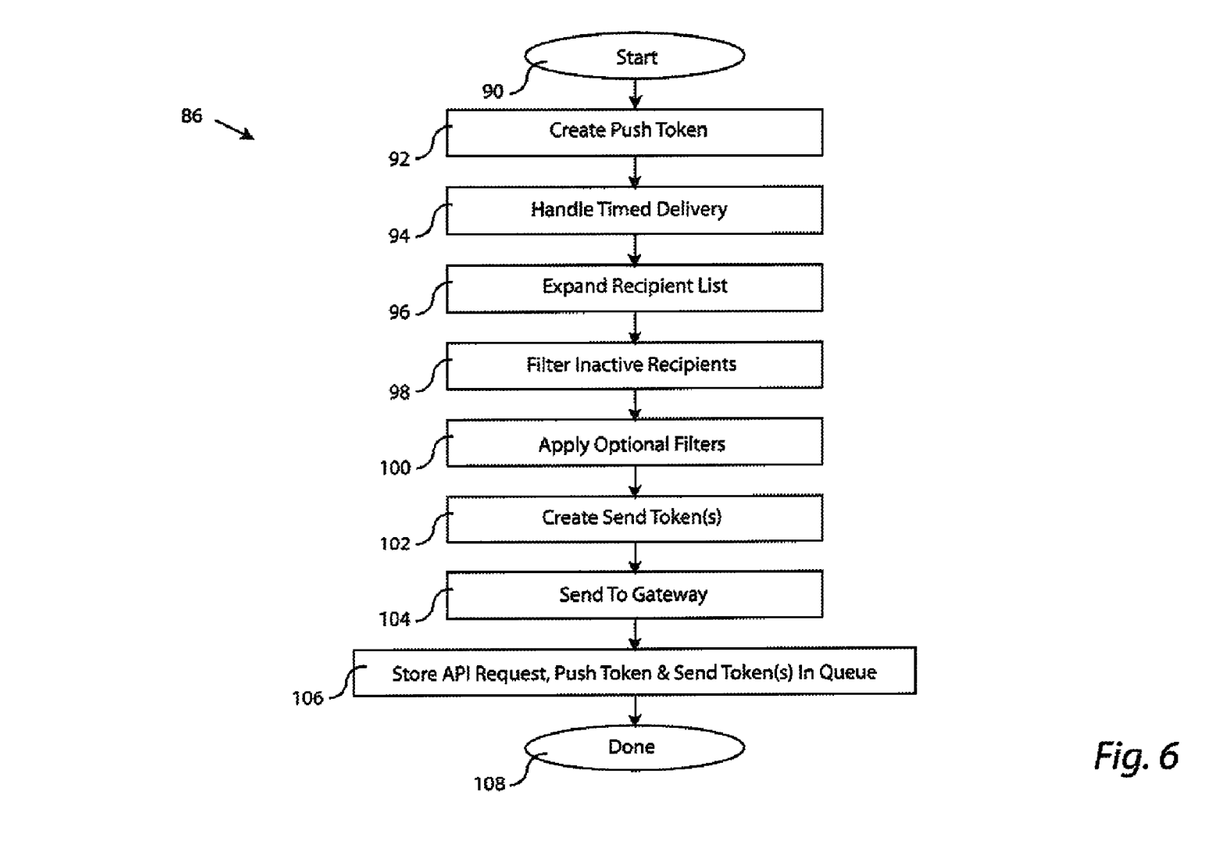
FIG. 6 is a flow diagram of an example process of the notification server system 12 of FIG. 1.

FIG. 6 is a flow diagram depicting an example PROCESS API CALL operation 86 of FIG. 5 in greater detail. The operation begins at 90 and continues with the creation of a push token in an operation 92. A push token may comprise a GUID (globally unique identifier) that is used to identify the received push and distinguish it from other received pushes. The push token is suitable to be used as a key for looking up information pertaining to the push. In an alternate embodiment the push token may not be a GUID, but some other form of identifier which is adequate to distinguish the push from other pushes that are presently stored.

Once the push token is created in operation 92, an operation 94 determines whether or not the push message corresponding to the push token should be deferred for delivery at a later time. If so, operation 94 defers the processing of the push message. The decision to defer the processing of the push message may be, by way of non-limiting example, based on a set of rules stored in a database, which may in some cases be modified by the push source. Such rules may state, for example, that certain messages should not be sent during a major sporting event.

The deferral of push messages may be recorded and a daemon, for example, can monitor the time and the state of deferred messages to determine which messages should be sent at a later time. When deferred messages that need to be sent are identified by the daemon, in this example, they continue in operation 86 just as non-deferred messages do in operation 96, which expands the recipient information in the push message into a list of actual recipients. In an alternative example, the handling of deferred messages can take place after operation 96 so that deferral rules that pertain to specific recipients may be implemented.

It should be noted that push notifications for individual recipients may, in some circumstances, be handled individually in a streaming fashion, or otherwise, rather than as a batch. Thus, as operation 96 expands the recipient list, a stream of recipients flows from operation 96 and the subsequent operations can be executed on a per-recipient basis concurrent with the generation of the recipient list in operation 96.

An operation 98, in this example, filters inactive recipients, such as persons who have removed the relevant application from their cell phone, mobile device or other device. Then, in an operation 100, optional filters are applied to further refine the list of recipients. For example, there may be a database entry for a given recipient which specifies that the recipient is not to receive push messages concerning product announcements. The optional filters may include other criteria such as a list of devices to which a certain type of message should not be sent. Persons of skill in the art will appreciate that a rich set of filters that are possible.

An operation 102 then creates a send token for each given recipient. The send token may be a GUID or alternatively some other type of identifier which is sufficient to distinguish a sent push notification from others that are presently stored in the system. Then, in an operation 104, a set push notification is sent to a push gateway, a client device, or otherwise, for each recipient. By way of non-limiting example, this may be accomplished by enqueuing the push notification in a queue that is used for the type of device. This queue is processed by a daemon that comprises code to format and send the push notification to the corresponding push gateway in the proper format, and using the proper protocols for that gateway. Then in an operation 106, the API request, push token, and send token(s) are stored in a queue, in this example. The process 86 is then completed at 108.

Figure 7:
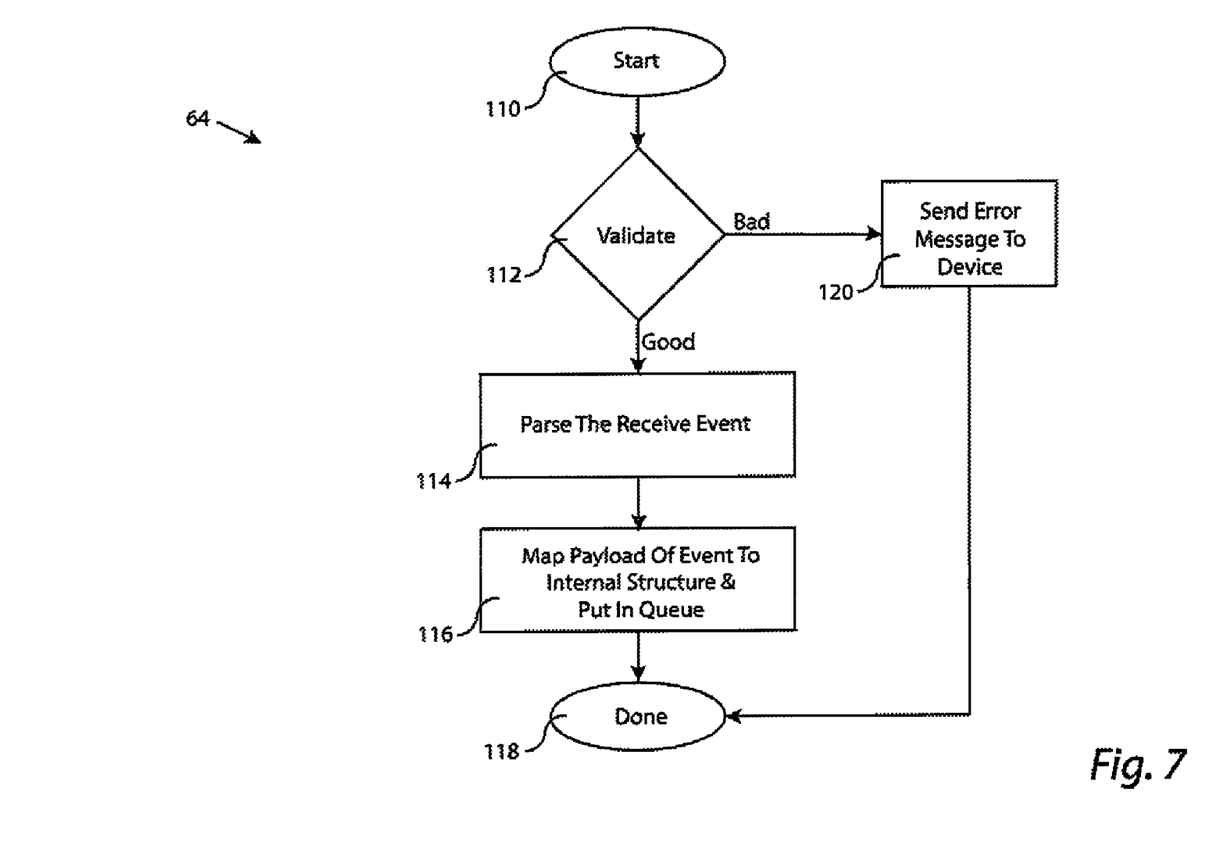
FIG. 7 is a flow diagram of an example is a flow diagram of an example process of the notification server system 12 of FIG. 1.

FIG. 7 is a flow diagram depicting an example process 64 for received push information 66 of FIG. 4. The operation begins at 110, and continues with an operation 112 which validates the received push information sent from a device to indicate that a sent push notification was received and/or processed by the device. If it is determined in operation 112 that the received push information is valid, the operation continues in an operation 114 which parses the receive event. In certain examples, the parsing operation 114 precedes the validation operation 112 or is concurrent with the validation operation 112. Next, in an operation 116, the payload of the received push information is mapped to an internal structure and placed into a queue. The process 64 is then completed in an operation 118. If it is determined in operation 112 that the receive event is not valid, an operation 120 sends an error message to the device that sent the receive event, which may be handled by the application program that sent the receive event. The operation is then completed at 118.

Figure 8:
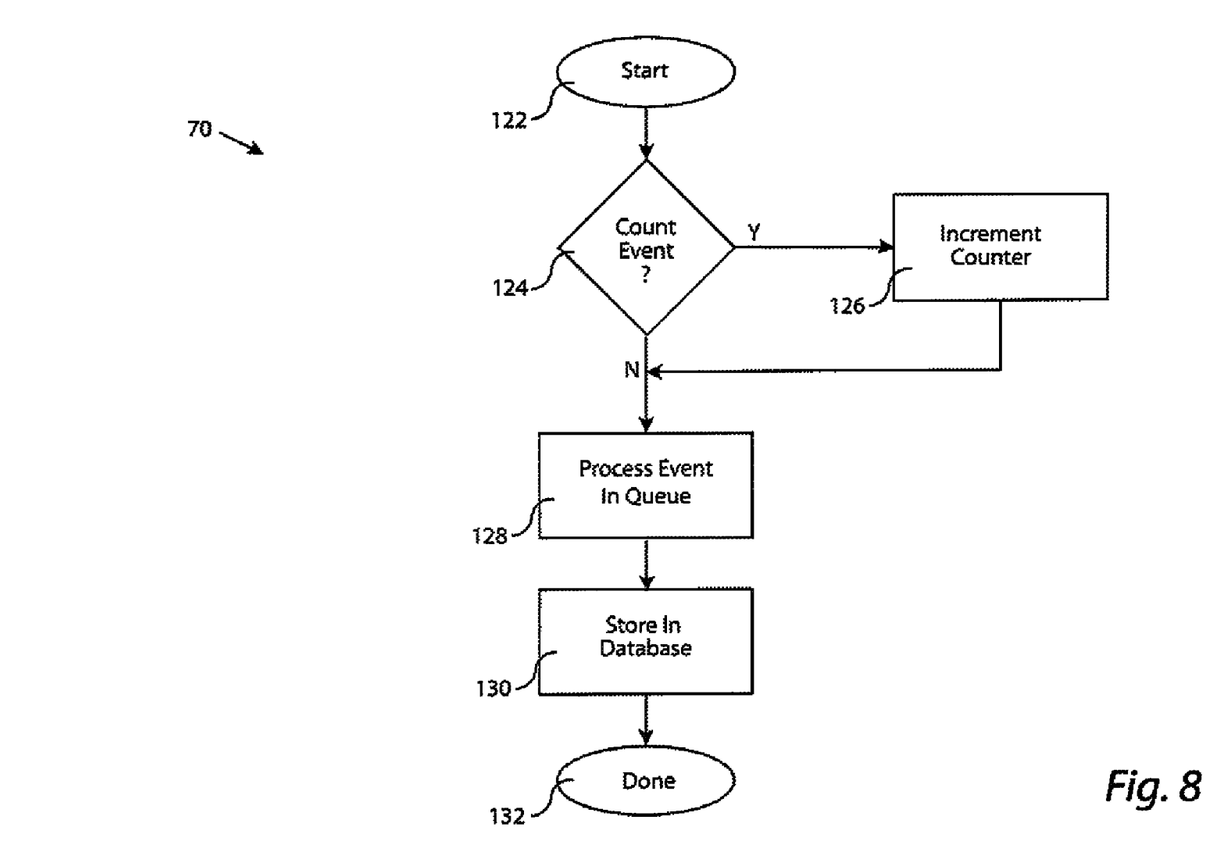
FIG. 8 is a flow diagram of an example process of the notification server system 12 of FIG. 1.

FIG. 8 is a flow diagram depicting an example PROCESS QUEUE process 70 which can be implemented by the notification server system 12. Process 70, in this example, begins at 122 and continues with an operation 124 which takes an enqueued event (e.g. received push information and/or app life cycle events) and determines whether or not to count the event in order to develop certain statistical measures, such as the number of times a given application program has been opened, initialized, closed, foregrounded or backgrounded. These and other statistics are useful for understanding the usage patterns associated with an application. If, in operation 124, it is determined that the event should be counted, then a counter associated with one or more statistical measures is incremented in an operation 126. If in operation 124 it is determined that the event should not be counted, the operation continues with operation 128.

Subsequently, in an operation 128, the event is processed. In certain examples, the processing of the event is performed in pipeline fashion where a number of transformations are cascaded together to form the pipeline. For example, such a pipeline could include a count operation, followed by an indexing operation which may develop a forward and or a reverse index into, for example, a "table X" followed by an indexing operation which may develop a forward and or a reverse index into, for example, a "table Y", optionally followed by one or more additional operations in the pipeline. When the event is processed, in this non-limiting example, it can be in an internal format such as, for example, a "Protocol Buffer" format. Code and documentation for Protocol Buffers is available from Google, Inc. of Mountain View, Calif. Then, in an operation 130, the event and or information pertaining to the event can be stored in a database. The process 70 is then completed in an operation 132. It should be noted that in certain examples, the queue or queues that are the subject of process 70 of FIG. 8 may include, for example, the queue or queues that are associated with the processes depicted in FIG. 6 and FIG. 7.

Figure 9:
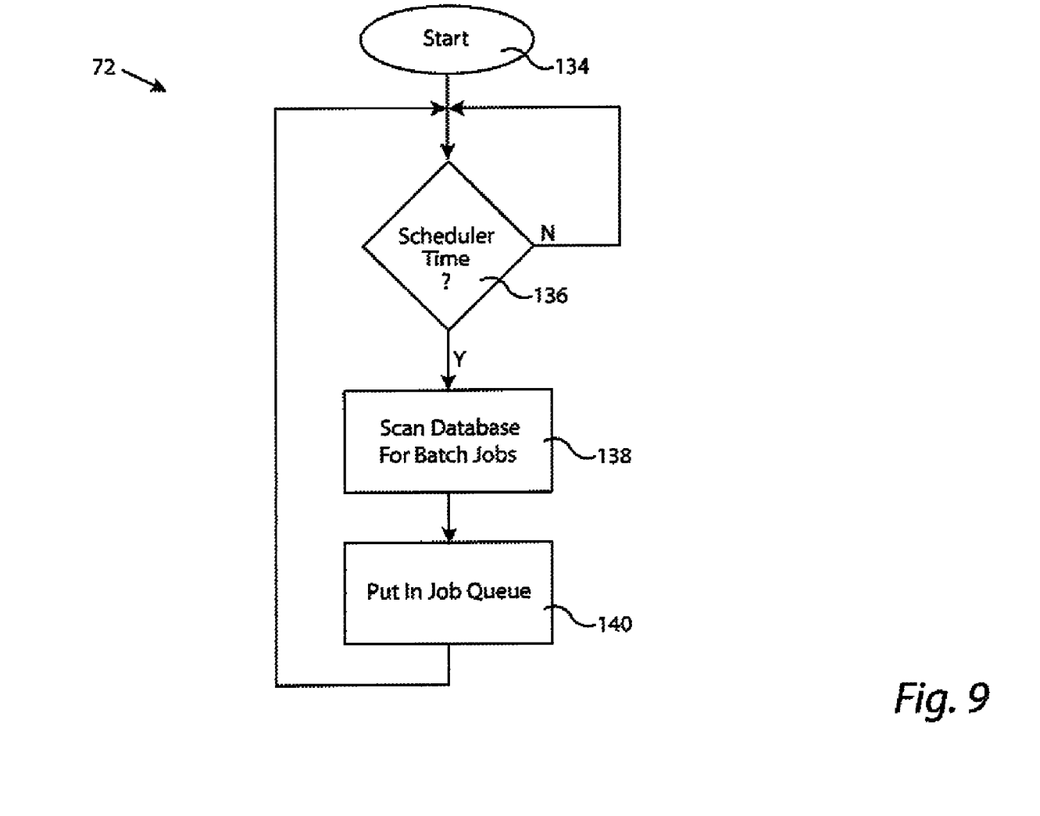
FIG. 9 is a flow diagram of an example process of the notification server system 12 of FIG. 1.

FIG. 9 is a flow diagram which depicts an example QUEUE SCHEDULE process 72 which may be implemented by notification server system 12. By way of non-limiting example, the process 72 begins at 134 and continues in an operation 136 which determines if it is an appropriate time to run a job scheduler. If it is determined in operation 136 that it is an appropriate time to run a scheduler then the operation continues in operation 138 which scans a database for batch jobs which need to be performed. Otherwise, the process idles with operation 136. Next, an operation 140 enqueues one or jobs that needs to be enqueued, in this example. The queue that is used by operation 140 may, for example, be part of a map-reduce infrastructure which distributes jobs to one or more worker machines.

In certain example embodiments, jobs have certain ranges of data upon which they operate, and the choice of worker machine will be determined by a range of data for the given job. The scheduler, in this example, initiates jobs based on the state of the database, e.g. activity by an application over a range of time, certain types of events such as those events that indicate that a user has viewed a push message, etc. Certain jobs are meant to generate derived data products from the data in the database, and may store their results in the database as well, or elsewhere. Some jobs may have a higher priority than others, with some jobs potentially waiting for days at a time in the queue.

Figure 10:
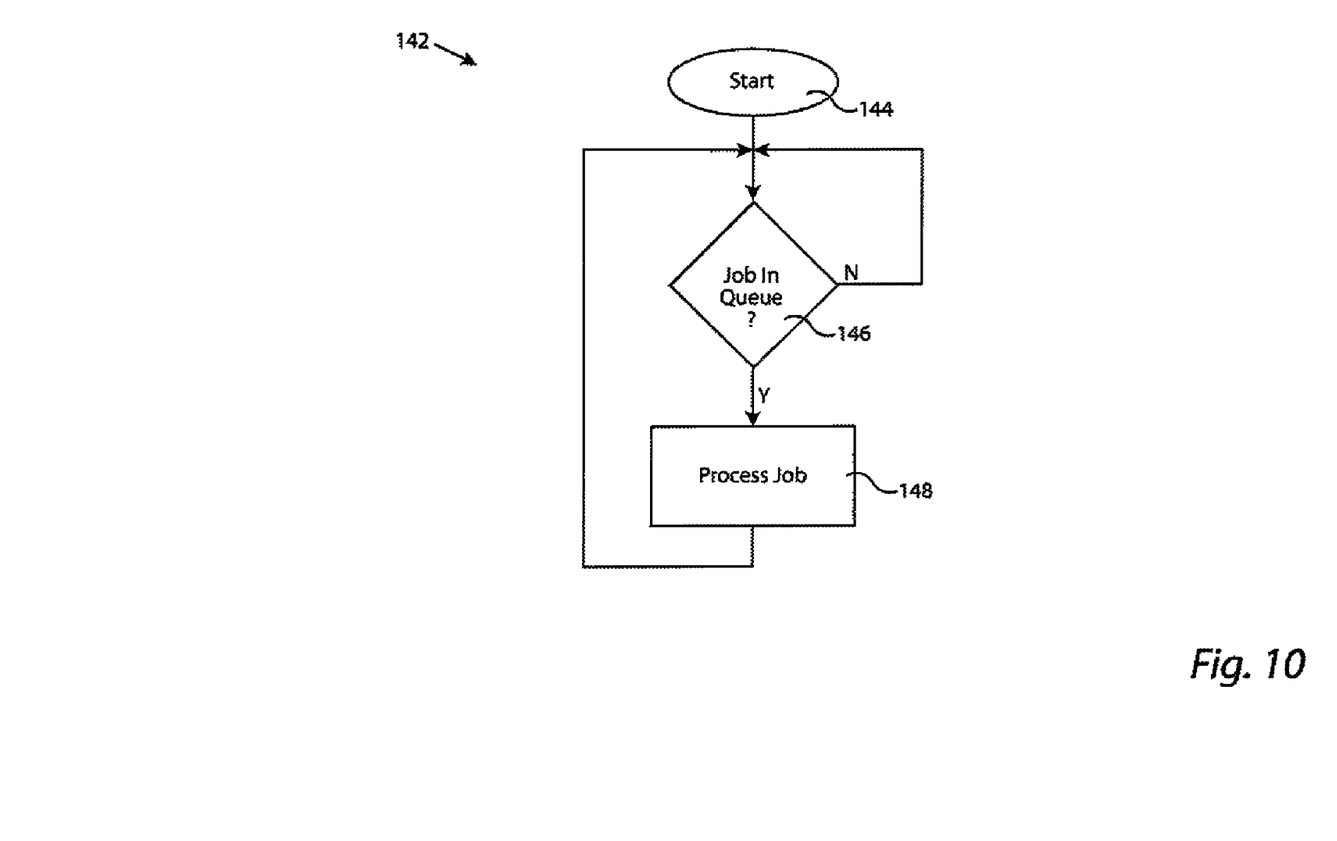
FIG. 10 is a flow diagram of an example process of the notification server system 12 of FIG. 1.

FIG. 10 is a flow diagram depicting a JOB PROCESSOR process 142 which monitors a queue and processes jobs from a queue, such as the queue used by the process of FIG. 9. The operation begins at 144 and continues in an operation 146 wherein a determination is made as to whether or not a job is available in the queue to be processed. If not, the process idles with operation 146. If it is determined in operation 146 that a job is available in the queue to be processed, the operation continues in an operation 148 which processes the job. The processing of the job may be performed locally, or may be part of a distributed computing infrastructure, e.g. map-reduce. For example the data range of the job may be determined, and then a distributed worker machine assigned based on the data range. The operation then returns to operation 146.

Figure 11:
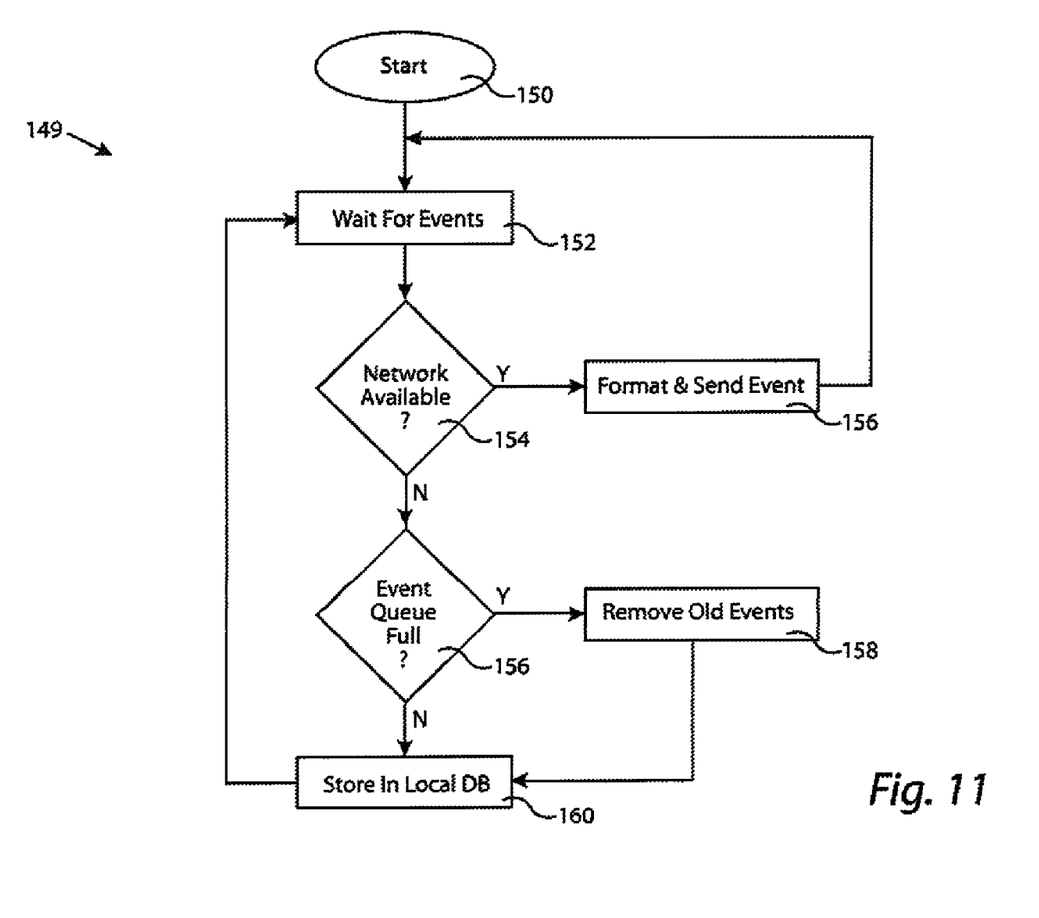
FIG. 11 is a flow diagram of an example process of the cell phone device 20 of FIG. 1.

FIG. 11 is a flow diagram depicting an example process 149 which can be performed on a cell phone, mobile device or other device or "client" that is configured to receive push notifications. The process 149 begins at 150 and continues in an operation 152 which waits for events. When an event is available, an operation 154 determines whether or not a network is available. If it is determined in operation 154 that a network is available, the operation continues in an operation 156 which formats and sends the event. The format may be any serialized form of the data to be sent, e.g. JSON or XML.

Operation 156, in this non-limiting example, can be applied not only to the data in the queue, but to data that has been stored in a local database that comprises events whose transmission has been deferred, possibly due to network inaccessibility or other factors that make the delivery of the information temporarily impossible. Information is cleared from the queue and the local database as it is successfully sent. The operation then continues with operation 152.

If it is determined in operation 154 that a network is not available, the operation continues with an operation 156 which determines whether or not an event queue in a local database is full. If it is determined that the event queue is full, the operation continues with an operation 158 which removes one or more of the oldest events from the event queue. The operation then continues in an operation 160 which stores the event in the event queue in the local database. If it is determined in operation 156 that the event queue is not full, then the operation continues with operation 160.

It will be appreciated that the forgoing systems and processes are, essentially computer implemented processes. As such, a number of different hardware and software platforms may be used to implement the systems and processes described herein. The processes are generally stored as program instructions including code segments in non-transitory computer readable media that can be accessed, directly or indirectly, by systems and/or devices as disclosed herein or otherwise. Furthermore, although various embodiments have been described using specific terms, words and/or phrases, such description is for illustrative purposes only. The terms, words and/or phrases used are for the purpose of description rather than of limitation.

It is to be understood that changes and variations may be made by those of ordinary skill in the art without departing from the spirit or the scope of the present invention, which is set forth in the following claims. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A method for delivery of push notifications comprising:
   receiving, via an interface, a message and destination information representing a plurality of destinations to which the message should be sent;
   creating, for each destination, a respective token associating the destination and the message;
   storing each of the created tokens;
   generating, for a given destination in the plurality of destinations, a push notification based at least in part on the given destination and the received message;
   sending the generated push notification to the given destination;
   receiving push information and determining, using a microprocessor, that the push information is associated with a status of a processing of the push notification at a device associated with the given destination, wherein the determination is based at least in part on the token created for the given destination; and
   storing the received push information.

2. The method of claim 1, further comprising determining, from a set of stored recipients, a subset of recipients to which the message should be sent based at least in part on the destination information.

3. The method of claim 1, further comprising determining that the message should be sent to all recipients included in a set of stored recipients.

4. The method of claim 3, further comprising refining a list of the plurality of destinations based at least in part on filter criteria, and wherein push notifications including the received message are sent to each of the destinations included in the refined list.

5. The method of claim 1, wherein the push notification is generated based at least in part on the token created for the given destination.

6. The method of claim 1, further comprising generating statistical information based at least in part on the received push information.

7. The method of claim 6, wherein the statistical information indicates usage patterns associated with an application program associated with the processing of the push notification.

8. A system for delivering push notifications comprising:
   a processor configured to:
      receive a message and destination information representing a plurality of destinations to which the message should be sent;
      create, for each destination, a respective token associating the destination and the message;
      store each of the created tokens;
      generate, for a given destination in the plurality of destinations, a push notification based at least in part on the given destination and the received message;
      send the generated push notification to the given destination; and
      receive push information and determine that the push information is associated with a status of a processing of the push notification at a device associated with the given destination, wherein the determination is based at least in part on the token created for the given destination; and
   a memory coupled to the processor and configured to provide the processor with instructions.

9. The system of claim 8, wherein the created tokens comprise identifiers used to distinguish one sent push notification from another sent push notification.

10. The system of claim 8, wherein the processor is further configured to determine, from a set of stored recipients, a subset of recipients to which the message should be sent based at least in part on the destination information.

11. The system of claim 8, wherein the processor is further configured to determine that the message should be sent to all recipients included in a set of stored recipients.

12. The system of claim 11, wherein the processor is further configured to refine a list of the plurality of destinations based at least in part on filter criteria, and wherein push notifications including the received message are sent to each of the destinations included in the refined list.

13. The system of claim 8, wherein sending the generated push notification to the given destination is deferred based at least in part on deferral rules.

14. The system of claim 8, wherein the push notification is generated based at least in part on the token created for the given destination.

15. The system of claim 8, wherein the processor is further configured to validate the received push information.

16. The system of claim 15, wherein in the event that the received push information is determined to be not valid, the processor is further configured to transmit an error message to the device.

17. The system of claim 8, wherein the processor is further configured to generate statistical information based at least in part on the received push information.

18. The system of claim 17, wherein the statistical information indicates usage patterns associated with an application program associated with the processing of the push notification.

19. The system of claim 17, wherein the statistical information includes a measure of a number of times an application program associated with the processing of the push notification has been opened, initialized, closed, foregrounded, or backgrounded.

20. A computer program product embodied in a non-transitory computer readable storage medium and comprising computer instructions for:

receiving a message and destination information representing a plurality of destinations to which the message should be sent;
    creating, for each destination, a respective token associating the destination and the message;
    storing each of the created tokens;
    generating, for a given destination in the plurality of destinations, a push notification based at least in part on the given destination and the received message;
    sending the generated push notification to the given destination; and
    receiving push information and determining that the push information is associated with a status of a processing of the push notification at a device associated with the given destination, wherein the determination is based at least in part on the token created for the given destination.

* * * * *